March 3, 1964 A. E. GALSON 3,123,533
PRESSURE RELIEF DEVICE FOR NEUTRONIC REACTORS
Filed Dec. 28, 1962 2 Sheets-Sheet 1

OPERATION OF VENTURI AT VARIOUS BACK PRESSURES

INVENTOR.
ALLEN E. GALSON
BY
ATTORNEY.

March 3, 1964     A. E. GALSON     3,123,533
PRESSURE RELIEF DEVICE FOR NEUTRONIC REACTORS
Filed Dec. 28, 1962     2 Sheets-Sheet 2

INVENTOR.
ALLEN E. GALSON
BY
ATTORNEY.

United States Patent Office 3,123,533
Patented Mar. 3, 1964

3,123,533
PRESSURE RELIEF DEVICE FOR NEUTRONIC REACTORS
Allen E. Galson, De Witt, N.Y., assignor to the United States of America as represented by the United States Atomic Energy Commission
Filed Dec. 28, 1962, Ser. No. 248,169
5 Claims. (Cl. 176—38)

This invention relates to means for minimizing the pressure loss, within a gas cooled neutronic reactor, of pressurized gaseous coolant after rupture downstream from the coolant outlet. More specifically, the invention relates to a venturi component in combination with gas coolant outlet means for pressure control of neutronic reactor structure, particularly in the production of superheat steam in a mixed spectrum superheat reactor.

This invention provides structure preventing rapid loss of gas pressure following rupture or break of gas containment means outside the core of a neutronic reactor or downstream in the utility components thereof. This function is made possible by venturi means at the gas outlet of the reactor core. Specifically, a venturi is disposed between a reactor core and gaseous outlet means in such a manner that the venturi produces an impediment to full flow upon rupture in the containment means, whereby pressure loss within the core is minimized. The venturi device requires no controls and is held in fixed relation with the gaseous outlet means. Other refinements and combinations are possible.

Design of components in the heat exchanger arts with the object of precluding rupture or failure of containment means under stresses of high temperatures and pressures frequently necessitates special precautions and design innovations depending upon the particular plant requirements and objectives. In neutronic reactors designed to provide heat for producing electricity or for other purposes the danger of contamination with radioactive particles places additional requirements upon design objectives. In the prior art it is already old to include dye markers and double wall construction in water, or other coolant, boiler tubes, as well as to include special instrumentation, in order to indicate failures or ruptures and to provide for partial or secondary containment of escaping fluid. In the past, however, little attention has been given to pressure relief devices minimizing energy losses in the event of failure of these containment components in neutronic reactor-heat exchanger systems. In larger reactors an alternate exchanger or piping structure is sometimes provided exterior to the reactor core so that in the event of rupture or failure the alternate units may be substituted as soon as instrumentation indicates loss of pressure, spread of radioactivity, etc. In most or many situations it is necessary to shut down the reactor entirely following such failure or accident, both to minimize heat loss and contamination until repairs can be effected and to prevent damage to core components caused by accumulation of heat.

In the present invention a venturi in combination with the vessel outlet nozzle is used to provide pressure relief following an accident in which there is a sudden loss of pressure in the core coolant gas piping exterior to the reactor core.

Severe forces are built up within a steam generator as a result of a rupture of core tubes or of components of the steam or other coolant gas outlet line and the resulting sudden reduction of pressure within the vessel. Associated with the reduction of pressure is a sharp increase in the density of coolant and in the mass flow rate out of the vessel. The magnitude of the low pressure front which proceeds along the steam line from the point of rupture and into or out of the vessel is such that the downstream sections can pass the mass flow at a density compatible with the pressure of the low pressure front. The mass flow rate is limited if sonic velocity is reached at some point in the pipe or vessel. The purpose of this invention is to insure that following a pipe rupture sonic velocity is reached at a chosen point and at a mass flow rate slightly above rated flow. Zero flow is not feasible as the reactor continues to heat up somewhat even after immediate shutdown. The consequence is that the contents of the vessel see only a slight change in conditions of pressure and flow and, therefore, are not damaged following loss of pressure downstream from the venturi.

The invention comprises incorporation of a venturi into the reactor coolant outlet line to prevent a rapid pressure loss upstream from the venturi from causing damage within the core, e.g., meltdown. A specific mixed spectrum super-heater reactor embodiment is suggested.

Accordingly, an object of the invention is to provide means for control of gas pressure within a reactor in which loss of pressure through pipe rupture causes damage from heat or energy loss. Another object is to provide means for control of heat or energy loss in a gas pressurized reactor in the event of a pipe rupture either within or without the reactor containment vessel. A further object of the invention is to minimize damages such as core meltdown or flooding in the event of coolant gas pipe rupture.

Another object of the invention is to provide means for restricting gas flow out of a gas-cooled reactor at the point of coolant exit in reactors in which a sudden pressure drop would damage the core or cause energy loss.

Another object of the invention is to provide such structure for restricting flow, i.e., venturi structure. Another object of the invention is to provide venturi structure restricting flow of steam coolant at the point of exit from a mixed spectrum superheater type reactor core.

The invention will be better understood upon examination of the following examples and figures, of which:

The functioning of a venturi or converging-diverging nozzle is well known. Venturis are frequently used as flow metering devices because of the relatively small pressure loss associated with them. To describe the functioning of a venturi the following symbols are used in FIG.

Figure 1:
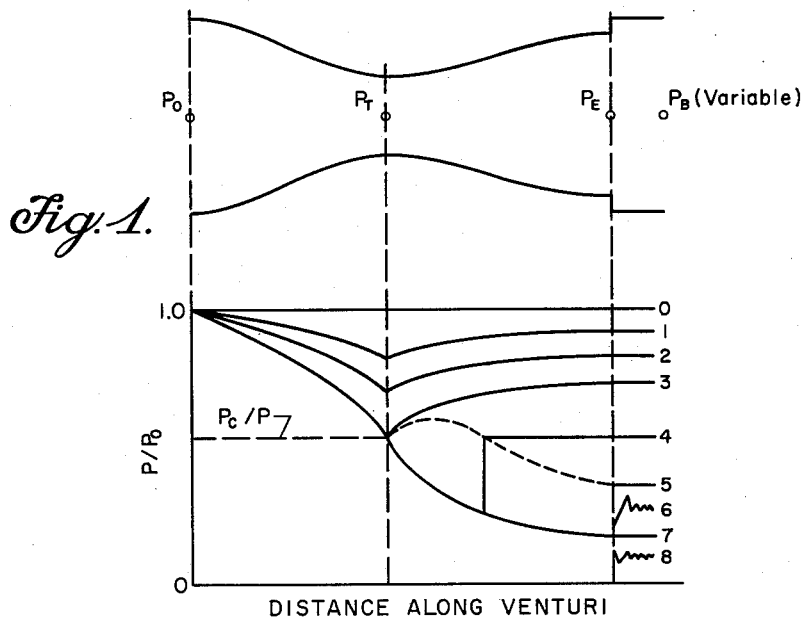
FIGURE 1 is a line drawing showing pressure versus distance along a venturi during operation at various back pressures.

1, illustrating the operation of a venturi and curves of pressure vs. distance along the venturi axis:

P—pressure
o—location upstream of the venturi
T—location of the venturi throat
B—location downstream of the venturi
C—magnitude at critical or sonic flow velocity
E—location at the exit plane of the venturi In FIGURE 1, an increase in flow rate obtained by condition 1 in which pressure gradient along the converging section reaches a minimum in the throat and is largely regained in the diverging section. An increase in flow rate obtained by reducing the back pressure $P_B$ results in condition 2 and further increase in flow rate results in condition 3 in which the throat pressure equals the critical pressure. Associated with the critical pressure (roughly equal to one-half the upstream pressure) is sonic velocity. At this condition the nozzle is said to be choked. A reduction in back pressure, below that of condition 3, results in no increase in flow rate or change in pressure in the converging section of the nozzle. Further reduction in the back pressure causes a normal shock wave to appear in the diverging section of the venturi, condition 4; a normal shock to appear at the exit plant of the nozzle, condition 5; oblique shock waves to appear downstream of the nozzle, condition 6; or oblique expansion waves to appear downstream of the nozzle. Thus, following a pipe rupture downstream of the venturi, the conditions upstream are stabilized by choking at the venturi throat. Subsequent to the rupture of the pressure vessel, e.g., a neutronic reactor pressure vessel containing the reactor core, the pressure can be gradually reduced by decreasing the rate of steam generation.

The venturi type outlet finds use in any reactor type in which pressure control is required to prevent sudden release of moderator coolant gas with consequent increase in reactivity which would cause excess heating, or where an advantage exists in preventing sudden loss of pressure and the energy associated therewith. A specific flare type venturi may be seen at point 101 of FIGURE 3, but no specific venturi structure is required for performance of the invention and in general any type venturi customarily used with high pressure steam may be utilized.

Figure 3:
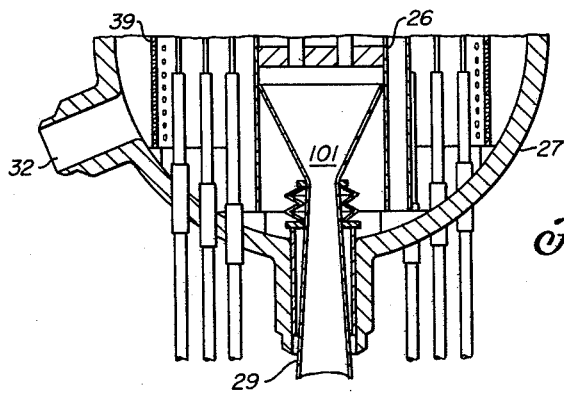
FIGURE 3 is a perspective elevated view, with portions cut away, of a portion of the mixed spectrum superheater reactor embodiment of FIG. 2 utilizing the venturi outlet of the invention, the same being shown in the lower portion thereof.
Figure 2:
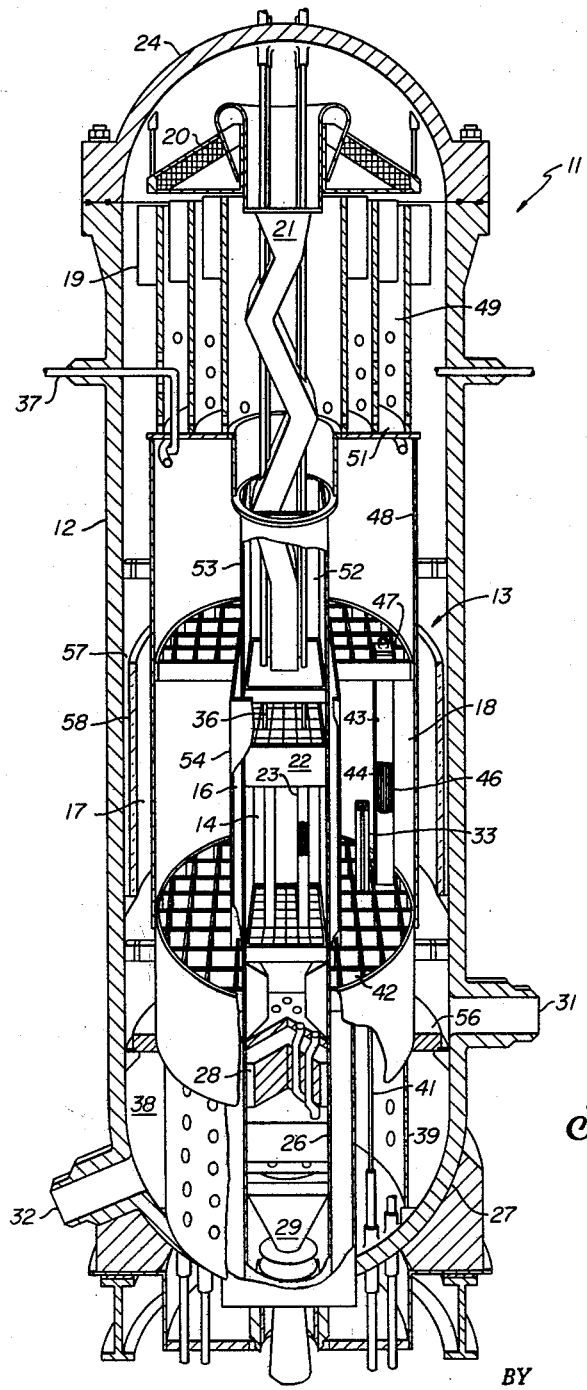
FIGURE 2 is a cross-sectional side view of a mixed spectrum superheater reactor embodiment utilizing the venturi outlet of the invention.

In the preferred embodiment of the invention, including a mixed spectrum superheat reactor as seen in FIGURES 2 and 3, there is shown a nuclear reactor 11 contained within a pressure vessel 12 in which both boiling of water and superheating of the resulting steam takes place. The reactor core 13 consists of four annular regions: an inner unmoderated superheating region 14, and inner unmoderated buffer region 16, an outer moderated buffer region 17 and a boiling region 18 which is very similar to that in a standard boiling water core. The mixed spectrum superheater reactor receives its name from the fact that the neutron spectrum varies from a thermal spectrum in the boiling part of the core to an intermediate spectrum between the boiling and superheating sections to a fast spectrum in the middle of the unmoderated superheater 14.

The reactor operates as follows: As shown in FIG. 2, water is boiled in the outer boiling core region 18. The steam water mixture passes up through parallel sets of radial type steam separators 19. The separated steam passes through steam dryers 20 and then travels down through an offset pipe 21 to the inner vessel 22 which houses the unmoderated superheating core 23. Water surrounding the offset pipe 21 reduces radiation steaming to the vessel head 24. After passing through the superheating core 23 the superheated steam leaves the pressure vessel 12 through the pipe 26 which penetrates the vessel bottom 27. Beneath the superheating core 23 within the pipe 26 are a series of shielding plugs 28 which reduce radiation steaming to the vessel bottom 27 and a venturi 29 at the outlet which serves to limit mass flow rate in the event of pipe rupture external or internal to the vessel 12.

Recirculating water leaves the reactor vessel 12 through three outlet nozzles 31 and is returned by three parallel mechanical-seal-type pumps (not shown) through three inlet nozzles 32.

The boiler power is controlled manually by bottom mounted poison elements 33 and the superheater power by top mounted control elements 36 containing fuel. To attain a desired power ratio between the boiling and superheating sections 18 and 14, respectively, use is also made of the top mounted control (poison) elements 37 in the water moderated buffer region 16. System steam pressure is regulated automatically by turbine control valves (not shown) and superheater outlet temperature by manual operation of the control elements in the superheating section 14.

More specifically, the flow of primary coolant water and steam-water mixture is directed along the following path through the reactor vessel 12 and fuel assembly 13 to 18. The water enters the vessel 12 through the three 24-inch nozzles 32 in the bottom head 27 of the vessel 12 and passes across the annulus space 38 between the vessel wall 27 and the diffuser basket 39. It then flows around the control rods 41 and underneath the boiler core support grid 42. The water then enters the bottom of each fuel assembly in the boiler 18, through the orifices (not shown) in the base of each fuel channel and enters the space around the individual fuel rods 43 and inside the channel 44 surrounding the fuel bundles 46. The water passes up along the fuel rods 43 where bulk boiling produces steam. Steam-water mixture leaves the fuel assembly at 47, passes upward through the channel extension 48 and into the plenum 49 from which the mixture enters the steam separators 19. Steam, centrifugally separated from the mixture, flows upward through the steam dryer 20 in the top head 24, and turns 180° to pass down through an offset duct 21 into the superheater region. Here the saturated steam is further heated by the fast spectrum core 23 and passes out through a mass flow limiting nozzle or venturi 29 to the turbine (not shown) as superheated steam. Water flows downward from the separators, across the top 51 of the plenum 49, and then down the annulus 52 between the vessel wall 53 and shroud 54 where it mixes with the incoming feed-water injected through a sparger (not shown). Water then flows along the inlet and outlet flow divider 56 to three 28-inch outlet nozzles leading to the recirculating pumps (not shown). Flow into the space 57 between the thermal shield 58 and the vessel wall 12 cools the thermal shield 58 and vessel wall 12.

A detailed summary of the reactor plant characteristics hereinabove disclosed and also shown in FIGS. 2 and 3 is hereinafter presented in tabulated form.

|  | Fast | Thermal |
|---|---|---|
| A. Heat Balance: |  |  |
| 1. Net Plant Power, MW(e) |  | 313 |
| 2. Total Reactor Power, MWt | 245 | 570. |
| B. Turbine Cycle Conditions: |  |  |
| 1. Throttle Temperature, °F |  | 950 |
| 2. Throttle Pressure, p.s.i.a |  | 1415 |
| 3. Total Steam Flow, lb./hr |  | $2.8 \times 10^6$ |
| C. Reactor Description: |  |  |
| 1. Reactor Vessel: |  |  |
| a. Inside Diameter, ft |  | 12½ |
| b. Inside Height, ft |  | 41 |
| c. Wall Thickness, in. (cylindrical portion). |  | 7¾ |
| d. Material |  | SA 302 B clad with 304 SS |
| e. Design Pressure, p.s.i.g |  | 1,800 |
| f. Design Temperature, °F |  | 650 |
| 2. Reactor Core: |  |  |
| a. Equivalent Diameter, in | 46 | 120. |
| b. Active Height: |  |  |
| Superheater/Boiler, in | 41.5 | 101. |
| Buffer, in | 41.5 | 44. |
| Reflector, in | 12¾ |  |
| c. Active Core Volume (incl. Buffer), ft.³ | 39.8 | 563. |

|  | Fast | Thermal |
|---|---|---|
| d. Fuel Loading: |  |  |
| Superheater, kg. Pu and U | 4,040 |  |
| Boiler: |  |  |
| Standard Rods, kg. U |  | 30,700. |
| Corner Rods, kg. U |  | 3,910. |
| Buffer, kg. U | 259 | 4,310. |
| Reflector, kg. U | 2,120 |  |
| e. Enrichment: |  |  |
| Superheater, a/o Pu-239 | 13 |  |
| Boiler: |  |  |
| Standard Rods, a/o U-235 |  | 2.3. |
| Corner Rods, a/o U-235 |  | 1.8. |
| Buffer, a/o U-235 | 5 | Depleted. |
| Reactor, a/o U-235 | Depleted |  |
| f. Structural Material | SS | Zr-2. |
| g. Neutron Moderator | None | $H_2O$. |
| h. Moderator to Fuel Ratio: |  |  |
| Boiler |  | 2.2. |
| Buffer Side Channels |  | 1.2. |
| Buffer Corner Channels |  | 1.3. |
| 3. Reflector: |  |  |
| a. Material | Depleted U | $H_2O$. |
| b. Axial Thickness, ft | 1.0 | 4. |
| c. Radial Thickness, ft | 0.8 | 1. |
| 4. Fuel Elements (for each type): |  |  |
| a. Fuel Material | $PuO_2$ | $UO_2$. |
| b. Fuel Element Geometry | Rods on Triang. Pitch. | Rods on Sq. Pitch. |
| c. Clad Material | SS | Zr-2. |
| d. Fuel Material Outside Diameter: |  |  |
| Superheater, in | .24 |  |
| Boiler: |  |  |
| Standard Rods, in |  | .392. |
| Corner Rods, in |  | .370. |
| Buffer, in | .24 | .750. |
| Reflector, in | .50 |  |
| e. Clad Thickness: |  |  |
| Superheater, in | .020 |  |
| Boiler: |  |  |
| Standard Rods, in |  | 0.26. |
| Corner Rods, in |  | 0.38. |
| Buffer, in | .020 | .040. |
| Reflector, in | .030 |  |
| f. Fuel-Clad Gap (cold), in. (Equilibrium). | ~0 | ~0. |
| g. End Plenum Length: |  |  |
| Superheater/Boiler, in | 3.5 | 3. |
| Buffer, in | 3.5 | 1.0. |
| Reflector, in | .5 |  |
| h. Gap Filler Material | He | He. |
| i. Manufacture Process (Equilibrium Core). | Vibratory Compaction. | Vibratory Compaction. |
| 5. Fuel Assemblies: |  |  |
| a. Number of Channels: |  |  |
| Superheater/Boiler | 36 | 76. |
| Buffer Corner | 4 | 4. |
| Buffer Side | 20 | 16. |
| b. Number of Assemblies/Channel: |  |  |
| Superheater/Boiler | 3 | 1. |
| Buffer | 3 | 2. |
| c. Number of Rods/Channel: |  |  |
| Superheater | 416 |  |
| Boiler: |  |  |
| Standard Rods |  | 193. |
| Corner Rods |  | 32. |
| Buffer Corner: |  |  |
| Buffer | 44 | 64. |
| Above Buffer |  | 179. |
| Buffer Side: |  |  |
| Buffer | 38 | 72. |
| Above Buffer |  | 193. |
| Superheat Control | 321 |  |
| Reflector: |  |  |
| Standard Channel | 81 |  |
| Control Channel | 64 |  |
| d. Cross Section Dimensions (Inside): |  |  |
| Superheater/boiler, in | 6.25 x 6.25 | 9.15 x 9.15. |
| Buffer Corner, in | 7.25 x 1 | 8.50 x 7.32. |
| Buffer Side, in | 6.25 x 1 | 9.15 x 7.32. |
| Superheater Control, in | 5.50 x 5.50 |  |
| e. Lattice Spacing, in | 6.5 | 10.0. |
| f. End Fitting Material | SS | SS. |
| 6. Reactor Control: |  |  |
| a. Method of Control | Fuel | Poison. |
| b. Absorber Material |  | Boron-SS. |
| c. Number of Control Elements: |  |  |
| Superheater/Boiler | 4 | 52. |
| Buffer |  | 8. |
| d. Cross-Section Dimensions: |  |  |
| Superheater (Square Shaped), in. | 5⅝ x 5⅝ |  |
| Boiler (40 cross shaped), in |  | 8⅜ x 8⅜. |
| Boiler (12 T-shaped), in |  | 12½ x 4⅛. |
| Buffer (T-shaped), in |  | 16¾ x 2⅞. |
| e. Effective Length: |  |  |
| Fuel/Poison Section, in | 41.5 | 100. |
| f. Type of Drive |  | Twin Screw Locking Piston |
| 7. In-Core Flux Monitors: |  |  |
| Number |  | 60. |
| Number per Channel |  | 4. |
| Number of Channels |  | 15. |
| D. Performance Data: |  |  |
| 1. Reactor Coolant | Steam | Water. |
| 2. Reactor Coolant Outlet Temperature, °F. | 950 | 600. |
| 3. Reactor Coolant Inlet Temperature, °F. | 600 | 592. |
| 4. Primary System Operating Pressure, p.s.i.g. | 1,500 | 1,500. |
| 5. Primary Coolant Flow, lbs./hr | $2.8 \times 10^6$ | $30 \times 10^6$. |
| 6. Ave. Core Coolant Velocity, ft./sec. | 122 | 8. |
| 7. Max. Fuel Center Temperature, °F. | 4,500 | 4,500. |
| 8. Max. Cladding Surface Temperature, °F. | 1,250 | 628. |
| 9. Burnout Safety Factor |  | 1.8. |
| 10. Max. Core Heat Flux, B.t.u./hr. ft.$^2$ | 610,000 | 362,000. |
| 11. Ave. Core Heat Flux, B.t.u./hr. ft.$^2$ | 224,000 | 99,000. |
| 12. Ave. Core Power Density, kwt./ft.$^3$ | 6,150 | 1,010. |
| 13. Peak to Average Power Ratio | 2.62 | 3.65. |
| 14. Ave. Specific Power, kwt./kg. U | 57 | 16. |
| 15. Fuel Management | 4 batch | 5 batch. |
| 16. Ave. Fuel Burnup, MWD/MT | 32,000 | 17,200. |
| 17. Peak to Average Burnup Ratio (including local peaking). | 1.3 | 2.04. |
| E. Suggested Containment: |  |  |
| 1. Design Criteria | ASME Code |  |
| 2. Type | Dry |  |
| 3. Primary Loop Coolant Inventory, lbs. | 155,000 |  |
| 4. Geometry | Sphere |  |
| 5. Diameter, ft | 160 |  |
| 6. Design Pressure, p.s.i.g | 25.8 |  |
| 7. Material | ASTM-A-201 | Grade B. |

Upon rupture of the containment means downstream from the venturi accumulated steam downstream from the venturi will tend to flow through the venturi unit and out the rupture. The sizing of the venturi with respect to the reactor flow and pressure, e.g., 20 p.s.i. for the reactor parameters disclosed, is carefully selected so that sonic velocity will be achieved at the outflow, and pressure loss will be minimized until the pressure leak can be shut down or eliminated.

Since the venturi to be effective will normally operate with near critical flow in the throat, careful study must be given in any given instance of the pressure transients which can occur in the vessel due to more than rated energy input. Pressure relief valves must be installed directly on the vessel to accommodate severe pressure transients. The high velocity in the throat during normal operation gives rise to an erosion problem, which probably would call for the application of specific materials of venturi-throat construction.

It will be appreciated that the various obvious modifications of the subject apparatus and method are contemplated to be within the skill of the art and therefore within the scope of the following appended claims.

What is claimed is:

1. A pressure relief device for use in a gas-cooled neutronic reactor comprising coolant outlet means for removing coolant gas from said reactor, and venturi means disposed in said coolant outlet means for restricting gas flow, said venturi means so constructed and arranged that the coolant gas reaches sonic velocity in the venturi means upon rupture of said coolant outlet means downstream from said venturi means.

2. A pressure relief device as defined in claim 1 in which said reactor includes a containment pressure vessel and said venturi is disposed interiorly of said vessel.

3. In a neutronic reactor having a core region cooled by a pressurized gaseous coolant and outlet means for conducting pressurized gaseous coolant exteriorly of said core region, a venturi disposed in said outlet means, said venturi defining a restricted throat region having a size providing sonic flow velocities of said gaseous coolant at flow rates above the normal flow rate of said gaseous coolant, whereby the flow of gaseous coolant escaping from said outlet means is regulated to safe levels above the normal flow rate of said coolant out of said reactor.

4. In a nuclear reactor having a core region contained within a pressure vessel and cooled by a circulating pressurized gaseous coolant, outlet conduit means coupled to said vessel for transporting said coolant to a point of utilization exterior to said vessel, and venturi means associated with said conduit at a location between the interior of said vessel and said point of utilization, said venturi means defining a throat in said conduit having a size constricted to produce coolant flow velocities approaching sonic velocities at rated flow rates of said coolant, whereby a significant increase in coolant flow above said normal flow rate produces sonic velocities in said venturi means and the exhaust flow of said coolant is thereby limited to a safe level.

5. The method of preventing rapid pressure loss in the core of a gas cooled neutronic reactor upon rupture of a coolant gas outlet which comprises restricting the outflow of coolant gas between the reactor core and the coolant gas outlet in such manner that the downstream pressure upon rupture falls below about one-half the reactor pressure, whereby the coolant gas reaches sonic velocity at the restriction.

References Cited in the file of this patent

UNITED STATES PATENTS 2,877,170   Greenhalgh et al. _____ Mar. 10, 1959

FOREIGN PATENTS 1,087,719   Germany _____ Aug. 25, 1960

OTHER REFERENCES

Boiling Water Reactors, Kramer, Atoms for Peace, Geneva, 1958.